G. B. BRADSHAW.
PROCESS OF DRYING COLLOIDAL SUBSTANCES.
APPLICATION FILED SEPT. 11, 1909.
1,161,603.
Patented Nov. 23, 1915.
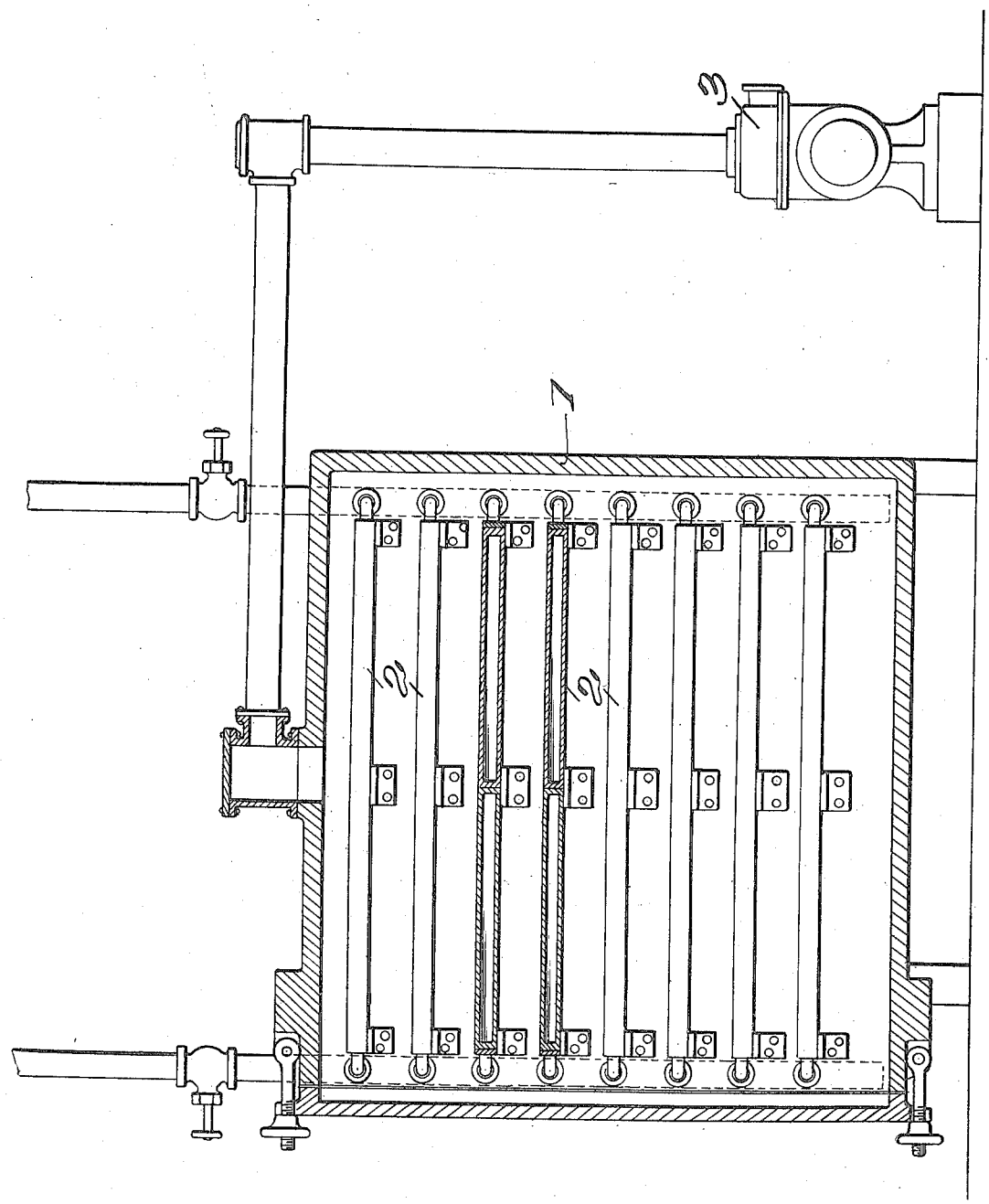

ions% UNITED STATES PATENT OFFICE.

GEORGE B. BRADSHAW, OF BROOKLYN, NEW YORK.

PROCESS OF DRYING COLLOIDAL SUBSTANCES.

1,161,603.	Specification of Letters Patent.	Patented Nov. 23, 1915.

Application filed September 11, 1909. Serial No. 517,327.

*To all whom it may concern:*

Be it known that I, GEORGE B. BRADSHAW, a citizen of the United States, residing at Brooklyn, in the county of Kings and State of New York, have invented certain new and useful Improvements in Processes for Drying Colloidal Substances, of which the following is a full, clear, and exact description, such as will enable others skilled in the art to which it appertains to make and use the same.

This invention relates to a process of treating rubbery, elastic or plastic materials and more particularly to certain features or steps in the process of drying colloidal substances such as rubber, by the use of a vacuum drier.

One of the objects of this invention is to provide a process whereby the efficiency of the ordinary drying apparatus is greatly increased.

Another object of this invention is to produce a better quality of rubber than is usually produced with vacuum driers.

Another object of the invention is to provide a process that may be carried out with an old form of apparatus yielding a larger amount of finished product per unit in a less time and at a cheaper cost.

Other objects will be in part obvious and in part pointed out hereinafter.

This invention accordingly consists in the several steps and the relation and order of each of the same with respect to one or more of the others thereof, which will be exemplified in the art hereinafter described, and the scope of the application of which will be indicated in the following claims.

The accompanying drawing shows diagrammatically a form of apparatus by which the process may be carried out.

In order to enable one to more clearly understand this invention it may be stated that an ordinary vacuum drier may be employed such as shown in patent to Mende, No. 664,962, January 1, 1901, consisting of a chamber 1 provided with a plurality of superimposed hollow steam heated shelves 2, the interior of the chamber being connected with a condenser and vacuum pump 3 for concentrating the vapor and air. A more detailed description may be obtained from this patent.

If a process of drying rubber in a vacuum drier were attempted in which the shelves of the drier were loaded with trays containing the sheets of rubber to be dried, the shelves upon which the wet rubber was supported being then heated with steam at ten to twenty pounds pressure and a vacuum maintained within the chamber until the rubber as nearly approached a condition of dryness as feasible with this method, the result would be very unsatisfactory. Guayule rubber, which is considered in the rubber industry to be the most difficult to dry, would require about eight hours for this step alone of the process. At the end of that time the rubber would very likely be found in a very badly melted condition and probably still containing specks of wet rubber where the moisture had become sealed, so to speak, in the semi-melted coating of rubber. If a higher steam pressure and more heat were used in the shelves, the rubber would be so melted by the long continued heat in the vacuum chamber that it could be scarcely removed from the trays, and, if the trays were piled with sheets of rubber to the full depth allowed by the distance between the shelves, the rubber in the center of the pile would not dry, due to the poor transfer of heat in the vacuum. Also, if the sheets of rubber were piled too high upon the trays and a high heat used within the shelves, the surface of the rubber would become melted and seal in the water contained in the intermediate sheets, and no amount of time in the vacuum chamber would dry the rubber when once in that condition. It is also to be noted that Guayule rubber conains a turpentine-like substance, which it is desirable to remove, and which would not be distilled off at the low temperature.

In the present process advantage is taken of the fact that some wet colloidal substances such as wet rubber can be heated throughout to a comparatively high temperature without injury, also that water, highly heated under pressure, is a good container of heat, and further that if the rubber can be rendered spongy while still wet, the volatile contents will all readily escape as vapor under the vacuum and not be sealed in by the melted surface thereof. Therefore, in carrying out this process, wet rubber is heated throughout to a very high temperature until it is thoroughly softened by the heat and its volatile contents are also raised to a high temperature and under the pressure of the rubber containing it. When the vacuum is applied, the rubber puffs up, becoming porous and spongy, and the very considerable heat stored throughout and in the absorbed water furnishes the extra heat necessary to complete the evaporation of the volatile contents, which takes up heat in evaporating and causes a simultaneous cooling of the rubber, whereby the whole mass is quickly dried and not seriously melted. Also, in this process, owing to the high temperature, considerable of the turpentine-like or other deleterious substances contained in the mass are distilled off.

A practical and efficient method of drying Guayule rubber for example, may be carried out as follows, although it is to be understood that various other kinds of colloidal substances may be dried in a similar manner: The bales of rubber, which are substantially two feet square and a foot thick and containing from twenty to thirty-five per cent. of water, are cut in slices from an inch and a half to two inches and a half in thickness and preliminarily heated in a hot chamber to dry off the surface and soften the rubber preparatory to sheeting, which I prefer to do with the ordinary differential rubber rolls. After being sheeted to from one sixteenth to three fourths of an inch in thickness, depending upon the quality of the rubber, the sheets are piled on trays to as great a thickness or depth as the distance between the shelves of the drier will permit, which, in the apparatus now generally used, is substantially two inches and a half. The trays containing the sheets of rubber are then charged into the drier and the whole heated for about two hours and a half to a temperature above 212° F. The condenser, connected with the interior of the drier chamber, automatically sucks out the steam formed, (the air within the chamber being all displaced by the steam given off from the heated rubber). At the end of substantially two hours and a half, the rubber is thoroughly softened and heated throughout and its contained water raised to a high temperature, thereby exerting a great pressure in its effort to escape. The steam pressure in the drier is then reduced to approximately forty pounds pressure and the vacuum pump started. Within three or four minutes the vacuum is raised because the apparatus contains steam, which is condensed, and not air. Upon creating the vacuum, the water in the rubber, due to the diminished pressure, changes suddenly to vapor which reduces the temperature and puffs up the whole mass of rubber, rendering it spongy and porous, whereby the water may thus readily escape. The vacuum is maintained for a comparatively short time or until it is found, by experience, that the rubber is dry. For very wet Guayule rubber, this requires approximately two hours and a half. Upon removing the trays the Guayule rubber will be found firm and absolutely dry and easily detachable from the trays and in many cases separable into the sheets in which it was originally piled. Within the condenser, and floating on the condensed steam from the rubber will be found the turpentine-like product, which has been distilled off from the Guayule rubber. Heretofore, by the ordinary method, this deleterious substance would not have been removed to any appreciable extent. Due to the manner of loading the trays to a greater depth, almost four times as much dry rubber can be taken from a given sized drier as by the ordinary process and in practically one half the time.

It will be seen from the above description that I have thus disclosed an art or method of drying a colloidal substance such as rubber which may be economically and quickly carried out by means of an old and well known form of apparatus, which results in an increase of efficiency of substantially eight hundred per cent. over methods heretofore employed. It is to be further noted that the product resulting from the use of the above described method of carrying on this art is of finer quality and is furthermore quite free from certain deleterious substances heretofore more or less present in rubber as formerly dried.

As many changes of this art may be employed in practice without departing from the scope of the invention and as various substances and different grades and kinds of rubber may be dried thereby, it is intended that all matter herein disclosed shall be interpreted as illustrative and not in a limiting sense.

It is also to be understood that the language used in the following claims is intended to cover all of the generic and specific features of the invention, herein described and all statements of the scope of the invention, which, as a matter of language, might be said to fall therebetween.

Having described my invention, what I claim as new and desire to secure by Letters Patent, is:

1. A process of the nature disclosed for rapidly reducing the water content of wet rubber consisting in preliminarily bringing the wet rubber throughout its mass to a temperature exceeding 212° F. and then creating a partial vacuum for enabling the heat stored in the mass to effect an evaporation of material amounts of the water therein to produce a spongy porous mass.

2. A process of the nature disclosed for rapidly reducing the volatile content of a colloidal substance, consisting in preliminarily bringing the colloidal substance throughout its mass to a temperature exceeding 212° F. and then creating a partial vacuum for enabling the heat stored in the mass to effect an evaporation of material amounts of the volatile content therein to produce a spongy porous mass.

3. A process of the nature disclosed for reducing the volatile content of a colloidal substance consisting in preliminarily bringing such substance under high pressure to an elevated temperature throughout its mass, and then reducing the pressure while said substance is in said heated condition to enable the volatile content to expand and render the substance spongy and facilitate the escape of the volatile content.

4. The herein described process of drying a rubbery substance, consisting in heating the substance within a chamber to the temperature of steam at approximately one hundred pounds pressure, simultaneously creating a vacuum and lowering the temperature within the chamber, thus withdrawing the steam given off by the material whereby the material is left in a dry and spongy condition.

5. The herein described process of drying a rubbery substance, which consists in preliminarily heating the material under pressure, and then lowering the pressure on the material, whereby the heated water in the substance may be changed to vapor and condensed.

6. The herein described process of drying a rubbery substance, which consists in exposing the substance in a separated condition to a temperature of steam exceeding twenty pounds pressure until the material has become thoroughly heated, reducing the temperature to which said material is exposed, by lowering the steam pressure and simultaneously lowering the pressure on said material, thus withdrawing the steam and moisture given off by the material as the same dries.

7. The herein described method of drying rubber, which consists in exposing the rubber within a chamber to a temperature of steam at over twenty pounds pressure for approximately two hours, then simultaneously creating a vacuum and lowering the temperature to which said material is exposed, whereby the moisture within the material exudes from the rubber in the form of steam and leaves the rubber in the form of a spongy porous mass.

8. The herein described method of drying rubber, which consists in exposing a plurality of superimposed sheets of rubber to a temperature of steam at over twenty pounds pressure until the rubber is thoroughly heated, lowering the pressure exerted on the rubber whereby the moisture within the rubber is converted into steam and exudes from the rubber, leaving the same in a dry and spongy condition.

9. The herein described method of drying rubber, which consists in placing a plurality of superimposed sheets of rubber within a chamber, subjecting said rubber to the heat of steam at substantially one hundred pounds pressure for approximately two hours until the rubber is thoroughly heated, lowering the steam pressure whereby the temperature within the drier is reduced, thus simultaneously lowering the pressure within the drier to below atmospheric pressure, and removing the steam and vapor formed by the drying rubber from said chamber, whereby the same is left in a dry and spongy condition.

10. A process of the nature disclosed for transforming a dense, yieldable, distortable, hydros substance into a dehydrated mass which consists in first bringing the mass to a temperature proximating the boiling point of water and then reducing the external air pressure on said heated mass whereby the contained water may be rapidly volatilized throughout the mass and escape while simultaneously producing a multiplicity of cells therein.

In testimony whereof I affix my signature, in the presence of two witnesses.

GEORGE B. BRADSHAW.

Witnesses:
 PAUL A. BLAIR,
 H. M. SEAMANS.